March 1, 1927.
P. J. McCLOSKEY
1,619,744
MECHANIC'S FISHING TOOL
Original Filed March 28, 1921
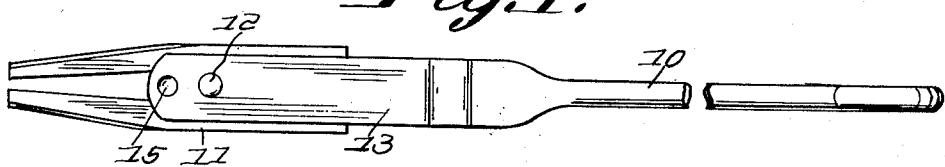
Fig. 1.
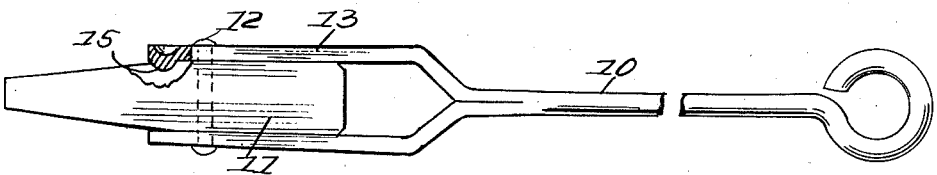
Fig. 2.
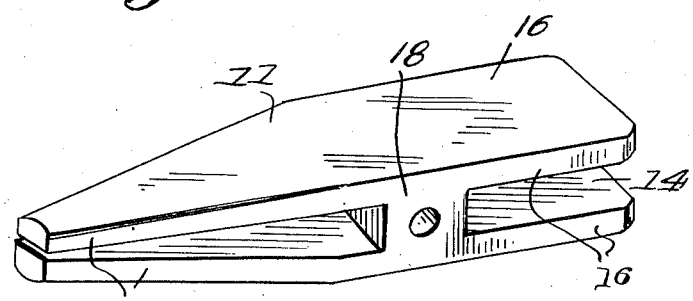
Fig. 3.
Fig. 4.
Inventor
Paul J. McCloskey,
By
Attorney Patented Mar. 1, 1927.

1,619,744

UNITED STATES PATENT OFFICE.

PAUL J. McCLOSKEY, OF ROSELLE, NEW JERSEY.

MECHANIC'S FISHING TOOL.

Application filed March 28, 1921, Serial No. 456,355. Renewed February 10, 1926.

The object of the invention is to provide a tool or implement of special utility in connection with automobile and other motor-driven vehicles, and explosion engines; but at the same time generally useful in machine shops, garages, and factories, as a means of retrieving small metallic objects from restricted pockets, chamber or casings, or from tanks, drip pans, and the like, as, for example, for removing screws, nuts, bolts, washers, valves, pins, caps and similar articles from gear casings which are difficult of access and into which an object of the class mentioned may be dropped by accident or in which it may have become loosened and from which is must be removed to permit of readjustment or to avoid injury to the mechanism; and a further object is to provide an implement which may also be used to advantage in turning hot pet-cocks and in reaching through or under obstructing objects in the adjusting or setting of drain or drip valves which by reason of their location cannot readily be reached by hand, or which can be manipulated in the ordinary way only at a risk to the operator.

With these objects in view, the invention consists in a construction and combinaton of parts, of which a preferred embodiment is illustrated in the accompanying drawing, wherein Figure 1 is a side view of the implement, Fig. 2 is a similar view showing the head reversed, Fig. 3 is a plan view of the head end of the same, partly in section, and Fig. 4 is a view in perspective of the head of the tool.

The device embodies essentially a stem or handle 10 of any suitable or convenient length, and a magnetic head 11 adapted for attractively engaging a metallic object of the type mentioned, said head in the construction illustrated comprising the spaced members 16 and 17 which are connected intermediate their ends by the transverse web 18 extending the entire width of the members. The head 11 is pivotally mounted as at 12 between the arms 13 of a fork formed on the end of the stem or handle.

Also, as affording a means whereby ordinarily inaccessible valves and pet-cocks may be opened or closed, the members 16 are formed rectangular and in parallel relation with each other to provide a wrench or key seat 14, capable of engagement with the finger-hold of a valve key, and if necessary the head may be turned at an angle to the length of the stem or handle to facilitate engagement therewith.

The magnetized members 17 are somewhat longer than the members 16 and taper and converge toward their extremities. This particular construction is very desirable inasmuch as it enables the recovery of objects which may have fallen through a small opening or into a corner or other inaccessible place and which could not be reached with the device were the members not so constructed.

Whereas, the arms of the yoke, which may be tensioned to exert frictional engagement with the side surfaces of the head, will serve to maintain the head in either of its adjusted positions with sufficient stability and security for all ordinary purposes, but a supplemental locking means may be employed in this connection, and as typical of such means a slight rounded knob or projection 15 is extended inwardly from one, or each, of the arms of the yoke to engage the slots between the poles and jaws of the head in its two positions in alinement with the stem.

The inconvenience, loss of time, and annoyance incident to attempting to recover a screw, nut, bolt, washer, or like object from a gear casing or other interiorly obstructed enclosure, which cannot be reversed or upset, and into which the hand cannot be extended, and in many cases into which light sufficient to enable the mechanic to see the object will not penetrate, has been experienced by everyone engaged in work with engines and machinery, and with a tool such as described herein, of small diameter and sufficient length, the purpose may be accomplished instantly, with the further advantage that the implement may be used as a scavenger or finder to ascertain whether or not there is any loose foreign object in a casing, well, or pocket, which perhaps contains an accumulation of oil at the bottom and into which the operator cannot see with sufficient clearness to detect the presence of a foreign object Having described the invention, I claim—

A tool for the purpose described comprising a pair of spaced elongated members, a transverse web secured to the inner faces of the members and extending the entire width thereof, the members at one side of the web being rectangular and in parallel relation with each other while the members at the opposite side of the web are somewhat longer and taper and converge toward their extremities, and a handle having a forked end which embraces the members and is pivotally secured to the said web.

PAUL J. McCLOSKEY.